(12) United States Patent
Tsuji et al.

(10) Patent No.: US 8,133,838 B2
(45) Date of Patent: Mar. 13, 2012

(54) WATER PURIFICATION MATERIAL

(75) Inventors: Hideyuki Tsuji, Yokohama (JP);
Tatsuoki Kono, Tokyo (JP); Akiko Suzuki, Tokyo (JP); Shinetsu Fujieda, Kawasaki (JP); Shinji Murai, Sagamihara (JP); Nobuyuki Ashikaga, Kawasaki (JP); Katsuya Yamamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 12/558,757

(22) Filed: Sep. 14, 2009

(65) Prior Publication Data
US 2010/0072140 A1   Mar. 25, 2010

(30) Foreign Application Priority Data
Sep. 25, 2008   (JP) ................. 2008-245198

(51) Int. Cl.
*B01J 23/42*   (2006.01)
(52) U.S. Cl. ...................... 502/328; 502/406

(58) Field of Classification Search .............. 502/300, 502/328, 400, 406, 439
See application file for complete search history.

(56) References Cited

OTHER PUBLICATIONS

Ookubo et al, Preparation of Phosphate Ion-Exchange Properties of a Hydrotalcite-like Compound, Langmuir, 1993 pp. 1418-1422.
Kawamoto et al, Phosphorus Removal from Wastewater by Layer Structure Inorganic Ion Exchanger with High Selectivity to Phosphate Anion, 1999, pp. 875-881.

*Primary Examiner* — Edward Johnson
(74) *Attorney, Agent, or Firm* — Turocy & Watson, LLP

(57) ABSTRACT

The present invention provides a water purification material capable of selectively adsorbing phosphorus dissolved in wastewater, and also provides a water purification method employing the material. The water purification material comprises a composite metal hydroxide containing iron ions and calcium ions in its structure, and this composite metal hydroxide has a layered structure. In the water purification method of the present invention, the water purification material is brought into contact with wastewater so as to remove and recover phosphate ions in the wastewater.

4 Claims, No Drawings

WATER PURIFICATION MATERIAL

CROSS-REFERENCE TO RELATED APPLICATIONS

This application is based upon and claims the benefit of priority from the prior Japanese Patent Application No. 2008-245198, filed on Sep. 25, 2008; the entire contents of which are incorporated herein by reference.

BACKGROUND OF THE INVENTION

1. Field of the Invention

The present invention relates to a water purification material capable of selectively adsorbing dissolved components, such as phosphate ions, contained in water such as river water, lake water, marsh water, sewage and industrial wastewater.

2. Background Art

Recently, the rapid globalization of economic activities has brought serious worldwide problems of water pollution and environmental pollution. At the same time, production activities in the global scale have led to exhaustion of resources and, as a result, not a few elements are getting regarded as rare elements.

Phosphorus is one of such rare elements. In these days, phosphorus ore has been becoming scarce in the global scale. Accordingly, phosphorus has been already considered as a rare element in recent years. On the other hand, as one of the measures against eutrophication problems of closed waters such as lakes, marshes and bay waters, phosphorus emission standards are strictly regulated. For removing phosphorus substances from the waters, it is widely known that coagulants such as calcium compounds are added so as to coagulate and precipitate the substances. However, since phosphates in water are generally in the form of poorly sedimentary floating matter, it is necessary to form floc so as to rapidly precipitate the phosphates. Consequently, a great deal of sludge is produced.

In order to treat the sludge in a large amount, it is inevitably required to scale up the treatment facilities. Accordingly, this costs a lot of money. Further, the coagulants make the floc contain various kinds of ionic components, and it is costly to separate them from the sludge. Because of these reasons, the sludge is very often not reused but disposed of as industrial waste at great cost. This is a problem.

As described above, in the case where phosphorus in water is removed according to conventional methods, there are various inefficient problems in the process of coagulation and precipitation by adding calcium salts. For example, it takes a long time to treat the phosphorus substances in water and moreover it is necessary to scale up the facilities and to dispose of the sludge.

In view of the above problems, a lot of new materials for water purification have been proposed recently. For example, as for removal of phosphorus substances, an adsorbent having a hydrotalcite structure is proposed as a high performance phosphorus remover (e.g., in Journal of Water and Environment vol. 22, No. 11, 875-881(1999), [in Japanese]). Hydrotalcite is a kind of layered inorganic mineral compounds, and negative ions are contained among the layers in the structure thereof. It is reported that, since the negative ions among the layers are exchanged with phosphate ions in water to remove them, the adsorbent can exhibit high phosphorus removability.

However, even the hydrotalcite cannot selectively ion-exchange only the phosphate ions in water. If carbonate ions or sulfate ions, for example, are contained in the water, they are ion-exchanged prior to the phosphate ions. This means that there is room for improvement in the selectivity to phosphate ions.

From the conventional viewpoint, namely, from the viewpoint of only the water pollution and environmental pollution, it is enough to remove harmful components from water. However, in consideration of the aforementioned problem of the fact that valuable resources are getting exhausted in the global scale, it is very important in the coming society to take into account the viewpoint of recovery and reuse of the resources. Accordingly, it is very important for the coagulants and adsorbents to be excellent in the selectivity as well as in the abilities of coagulation and adsorption, respectively. Particularly in regard to phosphorus, although a large amount of substances thereof is contained not only in household wastewater but also in industrial wastewater drained from food factories, drug factories and the like, there is the serious problem that phosphorus as a resource is becoming exhausted. It is, therefore, desired to provide an adsorbent exhibiting such high performance and selectivity as are not attained by conventional adsorbents or coagulants.

Hitherto, there have been presented various proposals concerning removers of water-dissolved components, particularly, of dissolved phosphorus, which is nowadays a resource feared to be exhausted. Most of the proposed removers are coagulants or adsorbents, but they catch not only phosphorus but also many other elements and hence have a problem of insufficient selectivity to phosphorus. Since having poor selectivity to phosphorus, those coagulants or adsorbents are to be disposed of as waste after they are used. This is a serious problem from the viewpoint that phosphorus should be efficiently recovered and reused. Further, it is another problem that known coagulants form floc so as to promote precipitation of the floating matter and consequently generate a large amount of sludge.

SUMMARY OF THE INVENTION

The present invention in one aspect resides in a water purification material comprising a composite metal hydroxide, wherein said composite metal hydroxide having a layered structure containing iron ions and calcium ions; and said material shows, as a result of X-ray crystal structure analysis, a diffraction pattern in which a total intensity of the main peaks attributed to calcium hydroxide or iron hydroxide is not larger than ½ of an intensity of the main peak attributed to the layered structure.

Also, the present invention in another aspect resides in a method comprising a step in which the above water purification material is brought into contact with wastewater so as to remove ionic species in the wastewater.

Furthermore, the present invention in another aspect resides in a method for purifying a wastewater containing phosphorus, comprising:

preparing a water purification material comprising a composite metal hydroxide having a layered structure containing iron ions and calcium ions; and selectively adsorbing the phosphorus contained in the wastewater by contacting the water purigfication material with the wastewater.

The present invention provides a water purification material excellent both in phosphorus adsorbability and in phosphorus selectivity. The water purification material according to the present invention makes it possible to adsorb phosphate ions with such high selectivity as is essentially impossible for known coagulants or adsorbents to realize. Accordingly, it is enabled not only to remove phosphorus from wastewater with high efficiency but also to recover and reuse the removed phosphorus and, as a result, to easily obtain phosphorus substances of high purity.

Further, even if the wastewater contains phosphorus in a high concentration, the water purification material of the present invention exhibits less lowered adsorbability as compared with conventional water purification materials. The present invention, therefore, provides a phosphorus adsorbent of very high performance.

DETAILED DESCRIPTION OF THE INVENTION

Embodiments of the present invention are described below.

The water purification material according to the present invention comprises a composite metal hydroxide containing iron ions and calcium ions. This composite metal hydroxide has a layered structure in which plural layers are stacked. Each layer has a basic structure in which octahedrons enclosing the calcium ions at the centers are two-dimensionally arrayed. In the composite metal hydroxide containing iron ions and calcium ions, the calcium ions participating in the layers can be considered to be partly replaced with the iron ions in the present invention. Accordingly, the layers are positively charged as a whole. Since there are negative ions and molecules of water of crystallization among the layers, the composite metal hydroxide is electrically neutralized as a whole.

The above structure of the composite metal hydroxide is similar to that of hydrotalcite. The hydrotalcite is, for example, represented by $[Mg_3Al(OH)_8]\frac{1}{2}CO_3^{2-}\cdot 2H_2O$. The structure of hydrotalcite is essentially formed by stacked brucite layers made of $Mg(OH)_2$. In each brucite layer, octahedrons enclosing the magnesium ions at the centers are two-dimensionally arrayed. The magnesium ions participating in the brucite layers are partly replaced with the aluminum ions. Among the brucite layers, there are carbonate ions and molecules of water of crystallization. As for properties of the hydrotalcite having that structure, it is known that the negative ions among the layers are exchanged with other negative ions. Accordingly, the composite metal hydroxide contained in the water purification material of the present invention can be considered to have a hydrotalcite-like structure. This means that the composite metal hydroxide used in the present invention is by no means a simple mixture of iron hydroxide and calcium hydroxide.

The composite metal hydroxide in the present invention contains metal elements of calcium and iron, but may further contain other metal elements (which are hereinafter referred to as "third metals") unless departing from the scope of the present invention. Examples of the third metals include magnesium, aluminum, zinc, zirconium, lanthanum and cerium. If the third metals are contained too much, they often affect the crystal structure and the like of the composite metal hydroxide to impair the effect of the present invention. How far the third metals affect the crystal structure of composite metal hydroxide is dependent on the sizes and the like of individual third metals, and therefore the third metals individually have different allowable contents. In general, however, the content of the third metal is preferably 5 mol % or less, more preferably 5 mol % or less based on the total amount of all the metal elements contained in the composite metal hydroxide.

As described above, the composite metal hydroxide in the present invention has a layered structure and contains negative ions among the layers. There is no particular restriction on the negative ions. However, since the composite metal hydroxide is used in the water purification material, it is not preferred to release unfavorable negative ions. It is, hence, preferred to contain eco-friendly negative ions. Examples of the eco-friendly negative ions include carbonate ions, halogen ions and sulfate ions.

The composite metal hydroxide in the present invention is presumed to adsorb negative ions by the chemical action of the iron ions or calcium ions with hydroxyl groups on the hydroxide surface. Further, it is also considered that, since the composite metal hydroxide has a layered structure, the negative ions can be not only adsorbed on the surface but also caught and ion-exchanged among the layers, whereby high removability can be obtained.

Phosphorus-containing ions among the negative ions, particularly, phosphate ions are highly adsorbed on the composite metal hydroxide in the present invention. Further, the composite metal hydroxide can selectively adsorb phosphate ions. The adsorbability and selectivity to phosphate ions are both so high as to be hardly shown by other composite metal hydroxides such as known hydrotalcite, and hence are specific characteristics of the composite metal hydroxide in the present invention.

The iron ions and calcium ions are present on the surface of the composite metal hydroxide according to the present invention. On the other hand, a lot of hydroxyl groups are also present on the surface of the hydroxide. The iron ions and calcium ions, therefore, react with the hydroxyl groups and consequently are attached on the surface, so that the resultant surface often seems to be covered with iron hydroxide or calcium hydroxide. This means that the water purification material of the present invention can further contain iron hydroxide or calcium hydroxide as well as the above composite metal hydroxide. Accordingly, in a diffraction pattern of X-ray crystal structure analysis, the peaks attributed to calcium hydroxide or iron hydroxide are often observed. If these peaks are too large, namely, if the iron ions or calcium ions are present on the surface in a too large amount, iron phosphate or calcium phosphate are formed, respectively, when phosphate ions are adsorbed, for example. Since the iron phosphate or calcium phosphate is in the form of floating matter, the sedimentation properties are seriously degraded in that case. Accordingly, the iron ions or calcium ions on the surface of the composite metal hydroxide is preferably in a small amount. The amount of iron ions or calcium ions can be determined by X-ray crystal structure analysis. In the diffraction pattern of X-ray crystal structure analysis, it is necessary that the total intensity of the main peaks attributed to iron hydroxide or calcium hydroxide on the surface be not larger than ½ of the intensity of the main peak attributed to the layered structure. As long as the amount of iron ions or calcium ions is within the range satisfying the above condition, the effects of ion-exchange among the layers and of adsorption on the surface are sufficiently obtained without impairing the sedimentation properties of water purification material having adsorbed the dissolved ions.

The composite metal hydroxide preferably used in the present invention is, for example, represented by the formula:

$$[Ca^{2+}_{1-x}Fe^{3+}_x(OH)_2].$$

On the other hand, normal hydrotalcite has a layered structure represented by $$[M^{2+}_{1-y}M^{3+}_y(OH)_2][A^{p-}_{y/p}\cdot qH_2O],$$

and hence the metal hydroxide included in the water purification material of the present invention can be considered to have a structure similar to that. In the present invention, however, not all the Ca and Fe ions participate in the fundamental structure of hydrotalcite. It is one of the characteristics of the present invention that Ca and Fe in the form of ions are attached on the surfaces of brucite layers in the hydrotalcite structure. Accordingly, to be exact, the stoichiometric ratio of the composite metal hydroxide in the present invention is different from that represented by the formula of hydrotalcite. However, it is another characteristic of the metal hydroxide in the present invention to have a layered structure characterizing the hydrotalcite structure. The composition of the composite metal hydroxide in the present invention, therefore, can be represented at least by the formula: $[Ca^{2+}_{1-x}Fe^{3+}_{x}(OH)_{m}]$. If the composite metal hydroxide has the same structure as normal hydrotalcite, the m in the above formula satisfies the condition of m=2. Actually, in the present invention, the Ca and Fe ions are additionally present on the surfaces of brucite layers and are liable to react with hydroxyl groups in water. The m in the above formula, therefore, is presumed to satisfy the condition of $1.6<m<2.3$, which is preferred in the present invention.

In the present invention, since it is indispensable to contain both iron ions and calcium ions, the x in the above formula may satisfy the condition of $0<x<1$. However, in order to enhance the effect of the invention, the condition is preferably $0.16 \leq x \leq 0.28$, more preferably $0.2 \leq x \leq 0.25$.

The composite metal hydroxide described above can be synthesized by any method. For example, the kinds and amounts of metal compounds as the starting materials are properly determined by reference to the well-known preparation process for hydrotalcite, and thereby the composite metal hydroxide can be desirably prepared from them.

In a concrete example, the composite metal hydroxide can be obtained from a hydrothermal reaction of a calcium-containing compound with an iron-containing compound. There is no particular restriction on the material compounds, and examples thereof include chlorides, carbonates, nitrates and sulfates of calcium and iron. The reaction solution preferably has a pH value in an alkaline range. The reaction can be conducted under high pressure in an autoclave as well as under atmospheric pressure. The reaction conditions are selected depending on the structure, particle size and the like of the aimed composite metal hydroxide. However, the reaction temperature is generally 25 to 200° C., preferably 60 to 95° C., and the reaction pressure may be atmospheric pressure. The reaction can be performed under high pressure or reduced pressure in an autoclave. In that case, the pressure is, for example, in the range of 0.01 to 2.0 MPa.

As described above, the water purification material of the present invention comprises the above composite metal hydroxide. The composite metal hydroxide can be directly used, for example, in the form of powder. However, if necessary, it can be formed or molded in various shapes according to the practical application. For example, it can be granulated alone or with a binder, can be loaded on an organic or inorganic film, or can be stuffed in a column. Further, the preparation processes for known porous materials can be applied. For example, when granulated with a binder, the composite metal hydroxide may be fired after the binder is impregnated therein, if necessary.

In the water purification method according to the present invention, the aforementioned water purification material is brought into contact with wastewater so as to remove ionic species in the wastewater. There is no particular restriction on how the water purification material is brought into contact with wastewater. For example, the water purification material in the form of powder or granulated particles is added in wastewater, and stirred, if necessary, to adsorb negative ions, and then precipitated out. This process is effective in treating a relatively large amount of wastewater. Although it is feared that the treatment facilities may need to be scaled up, the above process has an advantage that a large amount of wastewater can be treated in one batch. In a different way to bring the water purification material into contact with wastewater, the wastewater may be led onto a film supporting the water purification material or into a column filled with the material. This process can be carried out in relatively small treatment facilities, but the amount of treatable wastewater is limited. Accordingly, it is suitable for treating a small amount of wastewater.

The water purification method according to the present invention can be applied to wastewater having any pH value. However, under strongly acidic conditions, the water purification material is feared to be dissolved. In view of that, the pH range where the water purification method of the present invention is preferably applied is in the range of pH 2.0 to 14.0, more preferably pH 3.0 to 13.0. Accordingly, when the method of the present invention is used, the pH value of wastewater is preferably beforehand adjusted so that the effect of the present invention can be fully obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

EXAMPLES

The present invention is further explained by the following examples.

Example 1

In pure water, 8.3 g of calcium chloride and 4.1 g of iron(III) chloride were mixed. Aqueous NaOH solution was then added so that the mixture might be alkaline, to obtain 200 mL of a solution. The solution was kept at 80 to 100° C. for a few hours, to precipitate sediment. The sediment was collected by filtration, washed, and dried at 90 to 100° C. for a few hours to obtain a sample 1. The sample 1 was a composite metal hydroxide of calcium and iron. It was confirmed by ion chromatography and by ICP emission spectroscopy that the sample 1 was a composite metal hydroxide represented by:

$$[Ca_{0.75}Fe_{0.25}(OH)_{m}].$$

It was also confirmed by X-ray diffraction method that the above composite metal hydroxide had a layered structure.

On the other hand, a mixed aqueous solution containing phosphate ions, sulfate ions and nitrate ions, the concentrations of which were each 20 mg/L, was prepared as a simulated wastewater. After 20 mg of the sample 1 was added into 50 ml of the simulated wastewater, the mixture was stirred for 2 hours to undergo water purification treatment. Thereafter, the supernatant solution was collected and the concentrations of the ions contained therein were quantitatively analyzed, to measure the amounts of residual ions and adsorbed phosphorus. The results were as set forth in Table 1.

Example 2

The procedure of Example 1 was repeated except for employing 9.3 g of calcium chloride and 2.6 g of iron(III) chloride as the starting materials, to obtain a sample 2. It was confirmed in the same manner as in Example 1 that the sample 2 was a composite metal hydroxide represented by:

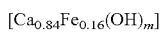
[$Ca_{0.84}Fe_{0.16}(OH)_m$]

and that the above composite metal hydroxide had a layered structure.

The water purification treatment in the same manner as in Example 1 was carried out by use of the sample 2. The results were as set forth in Table 1.

Example 3

The procedure of Example 1 was repeated except for employing 7.6 g of calcium chloride and 3.2 g of iron(III) chloride as the starting materials, to obtain a sample 3. It was confirmed in the same manner as in Example 1 that the sample 3 was a composite metal hydroxide represented by:

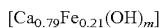
[$Ca_{0.79}Fe_{0.21}(OH)_m$]

and that the above composite metal hydroxide had a layered structure.

The water purification treatment in the same manner as in Example 1 was carried out by use of the sample 3. The results were as set forth in Table 1.

Example 4

The procedure of Example 1 was repeated except for employing 6.9 g of calcium chloride and 4.1 g of iron(III) chloride as the starting materials, to obtain a sample 4. It was confirmed in the same manner as in Example 1 that the sample 4 was a composite metal hydroxide represented by:

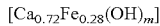
[$Ca_{0.72}Fe_{0.28}(OH)_m$]

and that the above composite metal hydroxide had a layered structure.

The water purification treatment in the same manner as in Example 1 was carried out by use of the sample 4. The results were as set forth in Table 1.

Example 5

The procedure of Example 1 was repeated except for preparing the simulated wastewater so that the concentrations of phosphate ions, sulfate ions and nitrate ions might be each 40 mg/L, to perform the water purification treatment. The results were as set forth in Table 1.

Example 6

The procedure of Example 5 was repeated except for employing the sample 2, to perform the water purification treatment. The results were as set forth in Table 1.

Example 7

The procedure of Example 5 was repeated except for employing the sample 3, to perform the water purification treatment. The results were as set forth in Table 1.

Example 8

The procedure of Example 5 was repeated except for employing the sample 4, to perform the water purification treatment. The results were as set forth in Table 1.

Comparative Example 1

In pure water, 8.0 g of aluminum chloride and 1.9 g of magnesium chloride were mixed. Aqueous NaOH solution was then added so that the mixture might be alkaline, to obtain 200 mL of a solution. The solution was kept at 80 to 100° C. for a few hours, to precipitate sediment. The sediment was collected by filtration, washed, and dried at 90 to 100° C. for a few hours to prepare a sample 5. The sample 5 comprised a hydrotalcite containing magnesium and aluminum. The water purification treatment in the same manner as in Example 1 was carried out by use of the sample 5. The results were as set forth in Table 1.

Comparative Example 2

The procedure of Example 5 was repeated except for employing the sample 5, to perform the water purification treatment. The results were as set forth in Table 1.

Comparative Example 3

The procedure of Example 1 was repeated except for employing 9.7 g of calcium chloride and 2.1 g of iron(III) chloride as the starting materials, to obtain a sample 6. It was confirmed in the same manner as in Example 1 that the sample 6 was a composite metal hydroxide represented by:

[$Ca_{0.87}Fe_{0.13}(OH)_2$]

and that the above composite metal hydroxide had a layered structure. However, in the X-ray diffraction pattern thereof, the intensity of the peak attributed to calcium hydroxide was larger than ½ of the intensity of the peak attributed to the layered structure. The water purification treatment in the same manner as in Example 5 was carried out by use of the sample 6. The results were as set forth in Table 1.

Comparative Example 4

The procedure of Example 1 was repeated except for employing 7.7 g of calcium chloride and 5.0 g of iron(III) chloride as the starting materials, to obtain a sample 7. It was confirmed in the same manner as in Example 1 that the sample 7 was a composite metal hydroxide represented by:

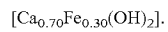
[$Ca_{0.70}Fe_{0.30}(OH)_2$].

However, it was found that a layered structure was not formed essentially in the above composite metal hydroxide. The water purification treatment in the same manner as in Example 5 was carried by use of the sample 7. The results were as set forth in Table 1.

TABLE 1

|  |  | Phosphate (mg/L) | Sulfate (mg/L) | Nitrate (mg/L) | Adsorbed phosphorus* | Filtration time** (min.) |
|---|---|---|---|---|---|---|
| Ex. 1 | Sample 1 | <1 | 19.7 | 19.8 | >50 | 1 |
| Ex. 2 | Sample 2 | <1 | 19.0 | 19.7 | >50 | 1 |
| Ex. 3 | Sample 3 | <1 | 18.9 | 19.8 | >50 | 1 |
| Ex. 4 | Sample 4 | <1 | 19.2 | 18.8 | >50 | 1 |

TABLE 1-continued

| | | Phosphate (mg/L) | Sulfate (mg/L) | Nitrate (mg/L) | Adsorbed phosphorus* | Filtration time** (min.) |
|---|---|---|---|---|---|---|
| Ex. 5 | Sample 1 | 5.6 | 39.4 | 39.4 | 86 | 3 |
| Ex. 6 | Sample 2 | 9.2 | 38.8 | 39.5 | 77 | 3 |
| Ex. 7 | Sample 3 | 8.8 | 39.1 | 39.3 | 78 | 3 |
| Ex. 8 | Sample 4 | 12.4 | 37.7 | 38.7 | 69 | 3 |
| Com. 1 | Sample 5 | 15.4 | 11.2 | 17.0 | 12 | 1 |
| Com. 2 | Sample 5 | 35.1 | 31.2 | 36.1 | 12 | 3 |
| Com. 3 | Sample 6 | 7.7 | 39.8 | 39.6 | 81 | 45 |
| Com. 4 | Sample 7 | 36.0 | 33.1 | 37.2 | 10 | 19 |

*The amount of adsorbed phosphorus in terms of milligram (mg) per gram (g) of the sample
**Time taken to complete the filtration for solid-liquid separation Table 1 shows the concentrations of residual ionic species in the simulated wastewater after treated, the amount of phosphorus adsorbed by each sample, and the time taken to complete the filtration for solid-liquid separation in the water purification treatment performed by use of each sample.

In any of Examples 1 to 4, the supernatant solution contained residual phosphate ions in a concentration less than the detection limit and accordingly the phosphate ions were almost completely removed. Further, it was also found that ions other than the phosphate ions remained so sufficiently that their concentrations were scarcely changed. This means that only the phosphate ions were selectively removed. Even in the case where the simulated wastewater contained phosphate ions in a high concentration (Examples 5 to 8), the same effect was confirmed. Moreover, it took a short time to complete the filtration and hence no practical problem was found in each Example.

On the other hand, however, in Comparative Examples, the concentration of residual phosphate ions was decreased in some degree but was still relatively high as compared with Examples. Further, the concentration of other ions, particularly, the concentration of sulfate ions was considerably lowered. It was also found that the nitrate ions in Comparative Examples less remained than those in Examples. Particularly in Comparative Example 3 (employing the sample 6), the concentration of residual phosphate ions was decreased but floc was so formed that it took a very long time to complete the filtration. Accordingly, this process was found to involve practical difficulties.

The invention claimed is:

1. A water purification material comprising a composite metal hydroxide, wherein said composite metal hydroxide having a layered structure containing iron ions and calcium ions; and said material shows, as a result of X-ray crystal structure analysis, a diffraction pattern in which a total intensity of the main peaks attributed to calcium hydroxide or iron hydroxide is not larger than ½ of an intensity of the main peak attributed to the layered structure.

2. The material according to claim 1, wherein said composite metal hydroxide has a hydrotalcite-like structure.

3. The material according to claim 1, wherein said composite metal hydroxide is represented by:

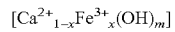
$[Ca^{2+}_{1-x}Fe^{3+}_{x}(OH)_m]$ in which x and m are numbers satisfying the conditions of $0.16 \leq x \leq 0.28$ and $1.6 < m < 2.3$, respectively.

4. The material according to claim 1, wherein said iron ions or calcium ions are attached on the surfaces of composite metal hydroxide layers constituting the structure of said composite metal hydroxide.

* * * * *